No. 657,772. Patented Sept. 11, 1900.
E. L. HOLMES.
BICYCLE PROPELLING MECHANISM.
(Application filed Feb. 23, 1900.)
(No Model.) 2 Sheets—Sheet 1.
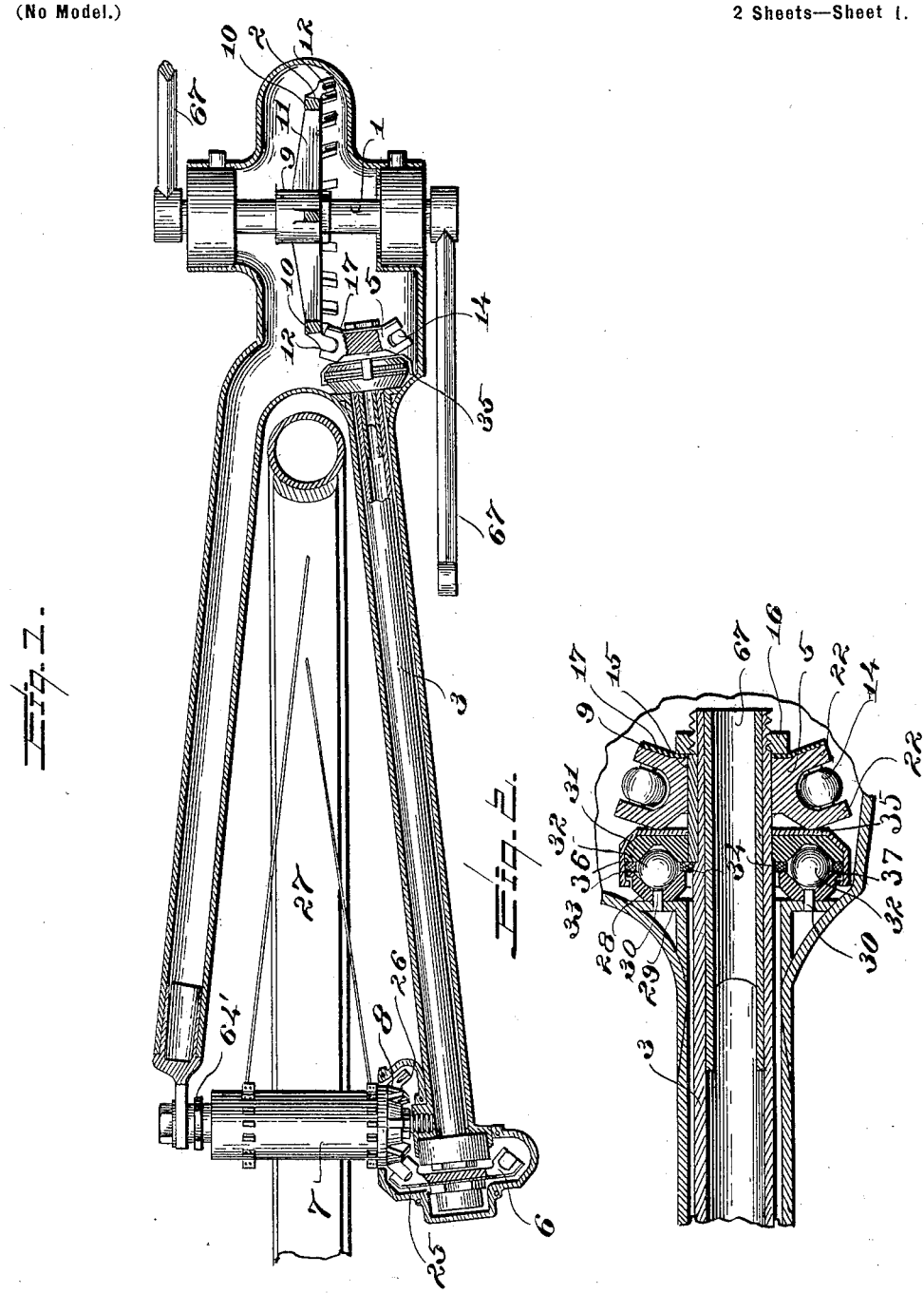

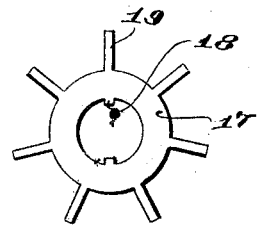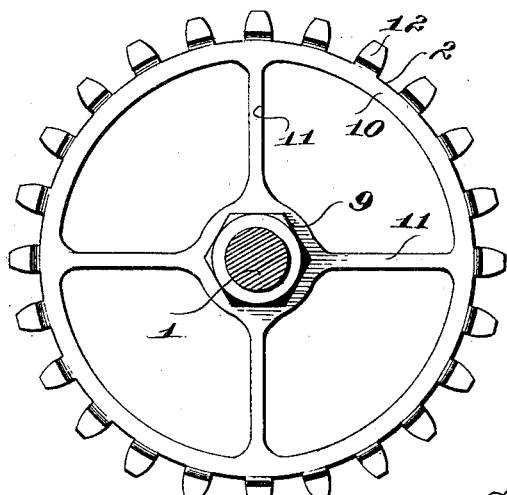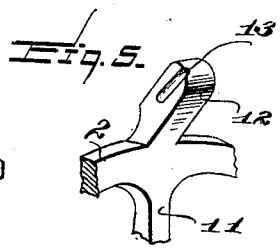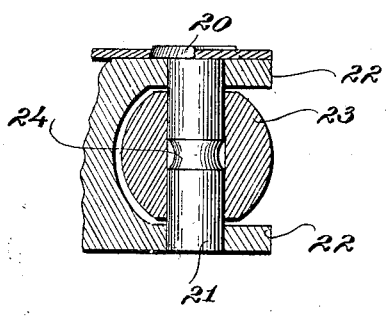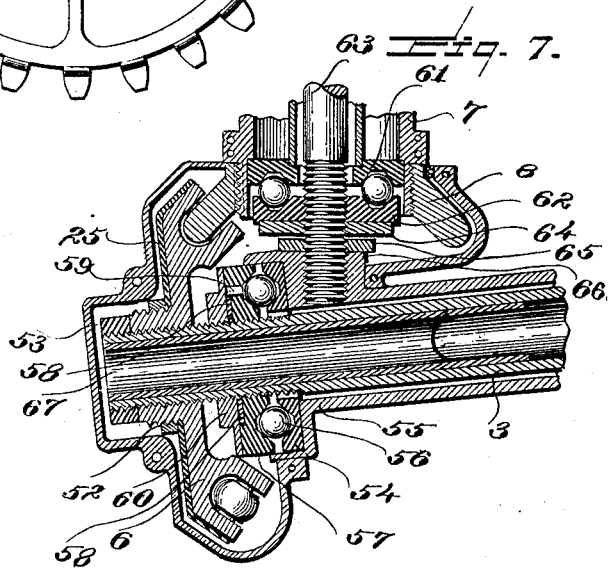

UNITED STATES PATENT OFFICE.

EDWARD L. HOLMES, OF CHICAGO, ILLINOIS.

BICYCLE PROPELLING MECHANISM.

SPECIFICATION forming part of Letters Patent No. 657,772, dated September 11, 1900.

Application filed February 23, 1900. Serial No. 6,293. (No model.)

*To all whom it may concern:*

Be it known that I, EDWARD L. HOLMES, a citizen of the United States of America, and a resident of Chicago, in the county of Cook and State of Illinois, have invented certain new and useful Improvements in Bicycle Propelling Mechanism, of which the following is a specification.

My invention relates particularly to the gearing and bearings for bicycle propelling mechanism. Its main objects are, first, to avoid the jar to the rider which is incident to the use of the ordinary chainless gear; second, to diminish the friction on gears of this class, and, third, to equalize the wear upon the pins on which the roller gear-teeth are mounted. I accomplish these objects by the mechanism shown in the accompanying drawings, in which—

Figure 1 is a horizontal section through the gear-casing of a bicycle constructed according to my invention. Fig. 2 is an enlarged section of the forward end of the transmitter-shaft, its bearings, and the gear mounted thereon. Fig. 3 is an end elevation of the spider for locking the pins upon which the roller gear-teeth are mounted. Fig. 4 is a front elevation of the large gear carried by the crank-shaft. Fig. 5 is a perspective view, partly broken away, showing the grooved side of one of the gear-teeth shown in Fig. 4. Fig. 6 is a section through one of the roller gear-teeth and part of the spider engaging the head of the pin. Fig. 7 is an enlarged detail section of the rear end of the transmitter-shaft, its bearings, and one end of the rear hub.

The device consists mainly of the crank-axle 1, the main gear 2, mounted thereon, the transmitter-shaft 3, having the gear 5 at its forward end and the gear 6 at its rear end, the hub 7 having the gear 8 meshing with said gear 6 and the casing and bearings, all of which will be hereinafter more fully described.

The main gear 2 has its hub 9 keyed to the shaft 1. A ring 10 is secured to said hub by means of the resilient arms 11. The gear-teeth 12 are mounted on the ring 10. Each of said gear-teeth has a groove 13 in one side for contact with the roller gear-teeth 14 of the gear 5. The gear 5 is rigidly secured to the shaft 3 by means of the key 15 and lock-nut 16. The spider 17 is secured between the gear 5 and nut 16. Said spider is shown in Fig. 3 and is keyed to the shaft by means of the projections 18. The arms 19 of said spider rest in grooves in the heads 20 of the pins 21. The pins 21 are seated in the forks 22 of the gear 5. Each of said pins carries a ball or roller 23 and is grooved at 24. The purpose of this groove is to lessen the friction and also to contain a lubricant. The grooves 13 in the teeth 12 serve to center the balls or rollers 23 on the pins 21, and thus avoid any friction between the ends of said rollers and the forks 22. The gear 6 on the rear end of the shaft 3 is provided with roller-teeth similar to those on the gear 5. A spider 25 serves the same purpose as the spider 17 and is similarly secured upon its end of the shaft. The gear 8 is provided with teeth 26, which are similar in structure to the teeth 12, the same also having a groove for centering the rollers in the gear 6. The gear 8 is rigid on the hub 7, which carries the drive-wheel 27 of the bicycle.

Referring to Fig. 2, 28 represents a bearing-shell, which is secured to the casing 29 by means of pins 30. The shell 31 is secured to the shaft 3 by means of the key 15 and, coacting with the shell 28, provides the four-point bearing for the balls 32. Felt washers 33 and 34 are held between the shells 28 and 31. The spider 35 has arms 36 extending over the flange 37 on said shell 28.

Referring to Fig. 7, the spider 25 is rigidly secured upon the gear 6 by means of the lock-nut 52. The gear 6 is keyed upon the shaft 3 and has the lock-nut 53 secured against its outer face. The rear bearing of the shaft 3 consists of the shell 54, which is rigidly secured to the casing 55, the balls 56, and the shell 57, which is rigidly secured to said shaft 3. A spider 58 is keyed to the shaft and secures the shell 57 against rotation by means of the pin 59. A lock-nut 60 is threaded upon the shaft against said spider and shell. The shell 61 is rigidly secured to the hub 7. The shell 62 is rigidly secured upon the shaft 63, extending through said hub. A lock-nut 64 acts against the shell 62 and a lock-nut 65 acts against the part 66 of the casing. The opposite end of the shaft 63 is provided with a shell similar to the shell 62 and with a lock-nut 64'. 67 represents a tubular reinforcing-plug, the transmitter-shaft 3 being hollow and having a similar plug inserted at each end.

The connection of the different parts and the operation of the bearings will be understood from the foregoing description.

The operation of the gears is as follows: When the shaft 1 is turned by means of the cranks 67, the arm 11 of the gear 2 being resilient will impart a slight spring action to said gear. This will avoid a jar to the rider through the action of the gear-teeth 12 with the gear 5. The rollers 14 will be positioned laterally in the fork through contact with the grooved side of the teeth 12. The balls are thus guided against friction with the inside of either arm of the fork. It will be seen that the wear on the pins 21 will be mainly on one side, being the side upon which the teeth 12 approach the rollers 14. After the bicycle has been used for some time the pins 21 may be given a half-turn, so as to equalize the wear on same. To turn said pins on the gear 5, it is only necessary to remove the nut 16, so as to free the spider 17 from the grooved heads of the pins 21. The pins may then be turned and again locked in position through said spider and nut. The pins on the gear 6 will be turned in similar manner through loosening the spider 25 and the lock-nut 52.

In case any of the balls or rollers 23 should be broken it will be seen that the pin 21 will still act against the teeth of the intermeshing gear. To replace such broken ball, it will only be necessary to remove the spider and draw out the pin. A new ball may then be inserted and the pin and spider again locked in their former position.

It will be understood that numerous details of the device shown may be altered without departing from the spirit of my invention. I therefore do not confine myself to such details except as hereinafter limited in the claims.

What I claim as my invention, and desire to secure by Letters Patent, is—

1. The combination of a gear-wheel provided with rigid teeth each having a groove in its side extending from the free end of the tooth toward its base, and an intermeshing gear-wheel provided with teeth consisting of pivotally-mounted balls arranged to have peripheral contact with said sides at the grooves, and to rotate in and move lengthwise of the grooves.

2. The combination of a gear-wheel provided with rigid teeth inclined at less than a right angle from the axis of the wheel each having a groove in its side extending from the free end of the tooth toward its base, and an intermeshing gear-wheel provided with teeth consisting of pivotally-mounted balls each having its axis inclined at an angle to the axis of said intermeshing gear-wheel, said balls being arranged to have peripheral contact with said sides at the grooves, and to rotate in and move lengthwise of the grooves.

3. A gear-wheel provided with teeth which consist each of a fork, a pin seated therein and a roller mounted on said pin, in combination with a removable spider adapted to engage each of said pins against revolution in its fork, substantially as described.

Signed by me at Chicago, Illinois, this 20th day of February, 1900.

EDWARD L. HOLMES.

Witnesses:
WM. R. RUMMLER,
GLEN C. STEPHENS.